April 27, 1954  G. H. GUSTIN  2,676,625
NONKICKBACK MEANS FOR POWER SAWS
Filed March 25, 1953
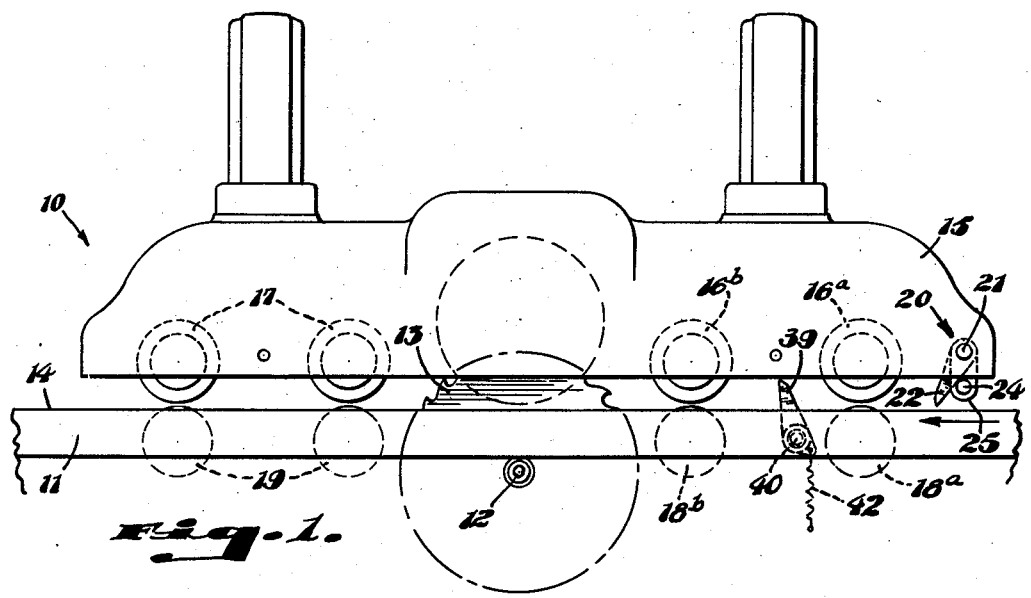
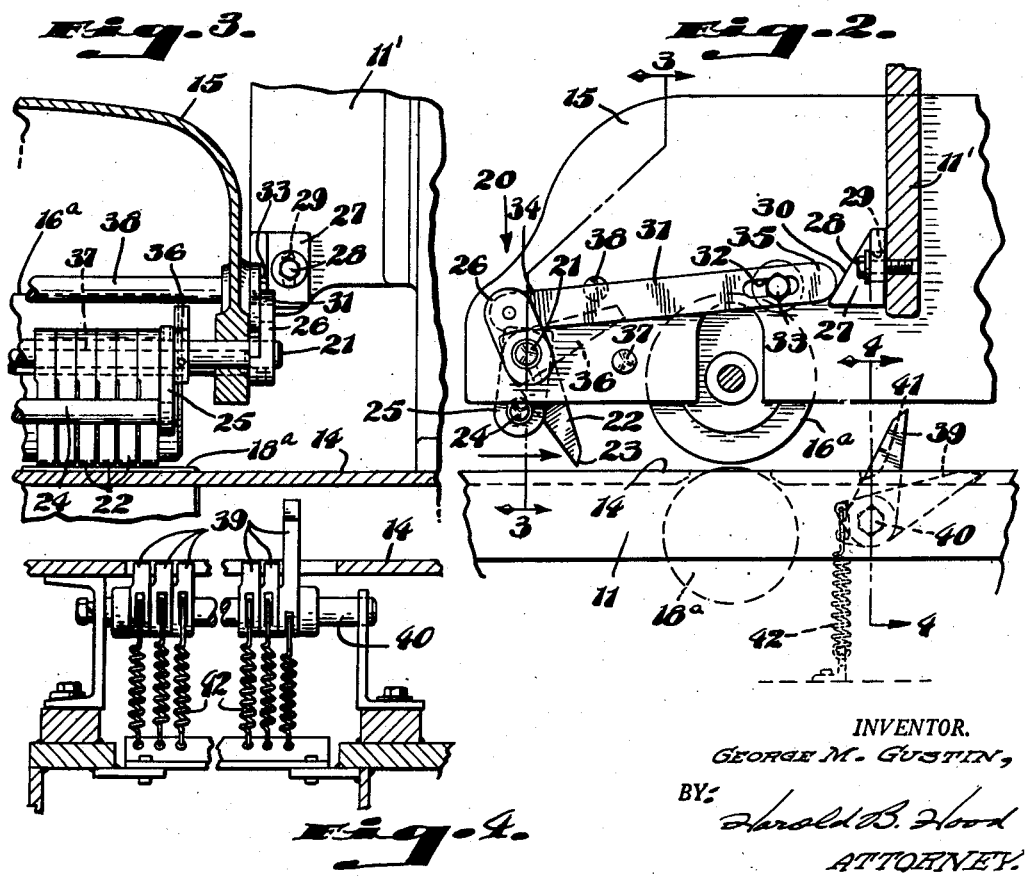
INVENTOR.
GEORGE M. GUSTIN,
BY: Harold B. Hood
ATTORNEY.

Patented Apr. 27, 1954

2,676,625

UNITED STATES PATENT OFFICE 2,676,625

NONKICKBACK MEANS FOR POWER SAWS

George M. Gustin, Wabash, Ind., assignor to The G. M. Diehl Machine Works, Inc., Wabash, Ind., a corporation of Indiana Application March 25, 1953, Serial No. 344,647

10 Claims. (Cl. 143—55)

The present invention relates to rip saws and particularly to means for preventing kick-back of the material moving through the saw. In one type of such saw, one or more circular blades are mounted for rotation in a saw table and project above the top of the table. A lower feed roll is journalled in the table ahead of the saw blade and a vertically adjustable header supports an upper feed roll in cooperative association with the lower roll. Very often, material passing through the saw is struck by the blade in such a way that it is driven back violently toward the operator. Slivers and knots formed and broken loose during the cutting of the material are likewise very often thrown toward the operator. Many serious accidents have resulted from such conditions.

It is the primary object of this invention to provide a first guard means carried by the header for continually engaging the work piece as it moves between the feed rolls and into the saw blade, such means being so constructed that it will dig into the material and prevent rearward movement thereof in case of kick-back of the work piece; and further guard means, working in combination with said first guard means, disposed in the path of material movement between the feed rolls and the saw blade, such means being so mounted as to be moved by the material out of its path but returnable to its first position after the material passes it to block any rearward movement of the slivers or loose knots, this combination being such as to prevent any possibility of the work or pieces thereof being kicked toward the operator.

A further object is to provide means for nicely adjusting the position of the first said guard means to maintain the proper clearance between that means and the table.

Ancillary objects will become apparent as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a side elevation, more or less diagrammatic, showing my invention in association with a machine of the type for which it is primarily intended for use;

Fig. 2 is a partial side view, on an enlarged scale, looking from the rear of the right-hand end of the machine of Fig. 1 and showing the operating details of my invention;

Fig. 3 is a transverse sectional view taken substantially on line 3—3 of Fig. 2 and showing the upper non-kick-back means; and Fig. 4 is a transverse sectional view taken substantially on line 4—4 of Fig. 2 and showing the lower non-kick-back means.

Referring more particularly to the drawings, it will be seen that I have illustrated a rip-saw 10, of more or less conventional design, having a table 11 in which is journalled a mandrel 12 on which is mounted one or more circular saw blades 13 projecting through suitable slots in the table top 14. A header 15 is vertically adjustably mounted on table 11 and carries, ahead of saw blade 13, a feed roll 16a, and sometimes a second such roll 16b, each journalled for rotation upon an axis substantially parallel to that of mandrel 12. Conventionally, further feed rolls 17 are mounted on the opposite side of blade 13.

Table 11 has journalled thereon a lower feed roll 18a directly beneath roll 16a for cooperative association therewith, and, where a roll 16b is employed, a mating roll 18b is provided in table 11. Similar mating rolls 19 are provided for cooperation with rolls 17.

The operation of such a saw gives rise to two types of hazards: as the material is fed between rolls 16a and 18a and engages saw blade 13, the material is very often in its entirety struck by the blade in such a way as to kick the entire piece of material rearwardly toward the operator; and as the material moves from between rolls 16a and 18a and then past blade 13, slivers and broken knots are very often formed and are likewise thrown rearwardly toward the operator.

To prevent the first occurrence, I provide a guard means, referred to generally by the reference numeral 20, carried by the header 15. An axle 21 is journalled in header 15 upon an axis substantially parallel to the axis of mandrel 12. A plurality of relatively thin finger elements 22 are journalled on axle 21, for independent swinging movement about the axis of said axle. Each such finger is formed at its free end with a chisel edge 23. Thus, as the material strikes fingers 22 the fingers are swung about axle 21 and the chisel edges 23 ride along the top of the material as it passes through the saw. The fingers are urged by gravity toward a position in which the chisel edges are pointing downward toward the table top 14. Should the material be moved rearwardly, these chisel edges will dig into the material thereby arresting such movement.

Since the header 15, on which fingers 22 are supported, is movable toward and away from table 11 to compensate for material of varying thickness, the chisel edges 23 would, in the absence of some preventative means, gouge into the table as the header is moved toward its lowermost position. To prevent this, I provide a bail element here in the form of a bar or rod 24 spanning the fingers 22 on the side thereof facing the input end of saw 10, said bar being supported at either end by links 25, 25 fixed to axle 21 for the swinging of rod 24 about said axle. A crank 26 is drivingly connected to axle 21.

A cam 27 is mounted upon a vertical extension 11' of table 11 preferably by means of a headed stud 28 taking through a vertical slot 29 in the cam body and supported on extension 11'. Thus, the cam can be vertically adjusted for a purpose soon to become apparent. The cam is provided with a surface 30 inclined downward and toward the input end of saw 10. A connecting rod 31 is provided with an axially extending slot 32 and a headed stud 33 takes through slot 32 and engages header 15. One end 34 of rod 31 is drivingly connected to crank 26 and the end 35 bears against cam surface 30.

As the header is moved upward, fingers 22, under the influence of gravity, engage rod 24 and swing it clockwise about axle 21, as viewed in Fig. 2. This rocks crank 26 to shift rod 31 axially toward cam 27. As header 15 is moved downward, end 35 of rod 31 rides against cam surface 30 to shift connecting rod 31 to the left (Fig. 2) thus rocking rod 24 about axle 21 to swing the chisel edges 23 of fingers 22 in the direction of material movement through saw 10. The sharpened ends of fingers 22 are thereby prevented from gouging into table top 14 as the header approaches its lowermost position relative to table 11.

During the time when header 15 occupies its lowermost position, as illustrated in the drawings, slivers and the like thrown rearwardly by blade 13 will most often be stopped by fingers 22. But as the header is raised until the fingers 22 hang free, there will be substantial clearance between the chisel ends 23 and the table top 14. At these times, slivers, and the like, thrown rearwardly will pass under fingers 22 and strike the operator. Further means to guard against this possibility are therefore needed.

To this end, I provide, between feed rolls 16a and 18a and saw blade 13, a further plurality of finger elements 39 mounted for independent oscillation upon a shaft 40 carried by table 11. These fingers are projectible through an opening 41 in table top 14 into the path of material moving through the saw. Coiled springs 42 engage each finger 39 to urge the fingers toward this projected position. As the material strikes the fingers, they are swung about shaft 40 into their dotted line position shown in Fig. 2, and the material passes over these fingers. As the trailing edge of the material passes by fingers 39, the fingers snap back to their projected positions. Thus slivers, loose knots, and the like, will strike the fingers as they are thrown rearward and be dropped through opening 41 in table top 14. The fingers 39 bear against the rear edge of opening 41 to prevent opposite movement of said fingers.

To limit the angular movement of rod 24 about axle 21, I prefer to provide an arm 36 fixed to axle 21. Stop means, here in the form of transverse rods 37 and 38, are located on either side of arm 36. By changing the angular relation between arm 36 and rod 24, the angle between fingers 22 and table top 14, when header 15 is in its extreme upper and lower positions, can be controlled. By loosening screw 28, cam 27 can be moved up or down to permit a nice adjustment of the clearance between the chisel ends 23 and table top 14. Thereafter this spacing is maintained by the action of connecting rod 31 against cam surface 30. And as the header is raised until rod end 35 moves above cam 27, arm 36 will strike stop 37 to maintain the fingers 22 at the proper angle relative to table top 14.

While each of the two sets of fingers performs a separate function, it is the combination of the two sets, constructed in accordance with my invention, which results in complete protection for the operator against material being kicked back toward him.

While I have illustrated and described my invention in connection with a power fed rip saw, it is obvious that it would serve equally as well in any type of power fed machine wherein the stated hazards exist, and it is not intended that the claims should be construed to limit my invention specifically to the application herein illustrated.

I claim as my invention:

1. For use with a power cutting machine comprising a material supporting table, a rotary cutter journalled from said table and having an active portion thereof disposed above the material-supporting surface of said table, a lower feed roll carried by said table ahead of said cutter for rotation upon an axis substantially parallel to the axis of said cutter, an upper feed roll, and header means mounting said upper feed roll above said lower feed roll in cooperative association therewith for rotation upon an axis substantially parallel to the axis of said lower feed roll, said header means being vertically adjustable to move said upper feed roll toward and away from said lower feed roll, the invention including non-kick-back means for said cutter located ahead of said cutter and comprising a plurality of finger means each having a chisel end, pivot means carried by said header means and supporting said finger means for swinging movement about a common axis, said finger means depending from said pivot means and being inclined toward said cutter with the chisel end of each thereof in close proximity with the top of said table, and means operatively engageable with said finger means and movable as said header means is lowered toward said table top to shift the chisel ends of said finger means in the direction of material movement through said machine to prevent said chisel ends from gouging into the top of said table.

2. The device of claim 1 in which said last-named means comprises an element embracing said finger means on the side thereof facing the input end of said machine, means carried by said header and supporting said element for movement toward and away from said cutter to move the chisel ends of said finger means in the direction of material movement through said machine, cam means, and follower means, one of said means being fixed relative to said table and the other of said means operatively engaging said element and cooperating with said one means for the movement of said element as aforesaid as said header is moved toward and away from said table.

3. The device of claim 1 in which said last-named means comprises a rod spanning said finger means on the side thereof facing the input end of said machine, said finger means being held by gravity against said rod but movable away from said rod in the direction of material movement through said machine, rod supporting means supporting said rod for swinging movement about the axis of said pivot means, cam means supported above said table adjacent said header means, a crank mounted for oscillation about the axis of said pivot means and drivingly connected to said rod supporting means, and a connecting rod supported for axial reciprocation on said header means, one end of said connecting rod operatively engaging said cam means with the other end of said rod drivingly connected to said crank.

4. For use with a power cutting machine comprising a material supporting table, a rotary cutter journalled from said table and having an active portion thereof disposed above the material-supporting surface of said table, a lower feed roll carried by said table ahead of said cutter for rotation upon an axis substantially parallel to the axis of said cutter, an upper feed roll, and header means supported above said table for vertical movement relative to said table and mounting said upper feed roll substantially vertically above said lower feed roll in cooperative association therewith for rotation upon an axis substantially parallel to the axis of said lower feed roll, the invention including non-kick-back means for said cutter comprising an axle journalled in said header means ahead of said upper and lower feed rolls upon an axis substantially parallel to the axis of said upper and lower feed rolls, a plurality of thin finger elements each journalled near one end on said axle in closely spaced relation and each formed with a chisel end opposite said one end, said finger elements being urged by gravity toward a position in which the chisel end of each thereof points downward toward the top of said table, a bail element comprising a portion spanning said finger elements on the side thereof facing the input end of said machine, and side portions substantially at right angles to the first said portion mounted at their free ends to said axle for rotation therewith to swing said first portion about the axis of said axle, a crank drivingly connected to said axle, cam means stationarily supported above said table adjacent said header means between said axle and said cutter, said cam means having a face inclined downward and toward the input end of said machine, a connecting rod, and guide means carried by said header means and supporting said connecting rod for axial reciprocation, one end of said connecting rod being drivingly connected to said crank with the other end thereof bearing against said cam surface.

5. The device of claim 4 in which said connecting rod is formed with an axial slot and said guide means comprises a headed pin taking through said slot and supported on said header means.

6. The device of claim 4 including an arm fixed on said axle for rotation therewith, and stop means carried by said header means and disposed in the path of said arm to limit the degree of oscillation of said axle.

7. The device of claim 4 including means so mounting said cam means that said cam means can be vertically adjusted relative to said table.

8. For use with a power cutting machine comprising a material-supporting table, a rotary cutter journalled from said table and having an active portion thereof disposed above the material-supporting surface of said table, a lower feed roll carried by said table ahead of said cutter for rotation upon an axis substantially parallel to the axis of said cutter, an upper feed roll, and header means mounting said upper feed roll above said lower feed roll in cooperative association therewith for rotation upon an axis substantially parallel to the axis of said lower feed roll, said header means being vertically adjustable to move said upper feed roll toward and away from said lower feed roll, the invention including non-kick-back means for said cutter comprising the combination of lower means located between said upper and lower feed rolls and said cutter, and upper means located ahead of said upper and lower feed rolls, said lower means comprising a plurality of finger means supported from said table for independent swinging movement about an axis spaced beneath the material-supporting surface of said table and substantially parallel to the axis of said cutter, said finger means being projectible above the material-supporting surface of said table into the path of material moving through said machine and engageable thereby to be swung about said axis and moved beneath the material supporting surface of said table as said material passes over said finger means, means for preventing movement of said finger means from their said projected positions in the opposite direction, and means resiliently engaging said finger means to urge them toward their projected positions, and said upper means comprising a plurality of finger means each having a chisel end, pivot means carried by said header means and supporting said finger means for swinging movement about the axis of said pivot means, said finger means being urged by gravity toward a position in which the chisel end of each thereof points downward toward the top of said table, and means operatively engageable with said finger means and movable as said header means is lowered toward said table top to shift the chisel end of each of said finger means in the direction of material movement through said machine to prevent said chisel ends from gouging into the top of said table.

9. For use with a power cutting machine comprising a material-supporting table, a rotary cutter journalled in said table and having an active portion disposed above the material-supporting surface of said table, a lower feed roll carried by said table ahead of said cutter for rotation upon an axis substantially parallel to the axis of said cutter, an upper feed roll, and header means mounting said upper feed roll above said lower feed roll in cooperative association therewith for rotation upon an axis substantially parallel to the axis of said lower feed roll, said header means being vertically adjustable to move said upper feed roll toward and away from said lower feed roll, the invention including non-kick-back means for said cutter comprising the combination of lower means located between said upper and lower feed rolls and said cutter, and upper means located ahead of said upper and lower feed rolls, said lower means comprising a plurality of finger means supported from said table for independent swinging movement about an axis spaced beneath the material-supporting surface of said table and substantially parallel to the axis of said cutter, said finger means being projectible above the material-supporting surface of said table into the path of material moving through said machine and engageable thereby to be swung about said axis and moved beneath the material-supporting surface of said table as said material passes over said finger means, means for preventing movement of said finger means from their said projected positions in the opposite direction, and means resiliently engaging said finger means to urge them toward their projected position, and said upper means comprising an axle journalled in said header means ahead of said upper and lower feed rolls upon an axis substantially parallel to the axis of said upper and lower feed rolls, a plurality of thin finger elements each journalled near one end on said axle in closely spaced relation and each formed with a chisel end opposite said one end, said finger elements being urged by gravity toward a position in which the chisel end of each thereof points downward toward the top of said table, a bail element comprising a portion spanning said finger elements on the side thereof facing the input end of said machine, and side portions substantially at right angles to the first said portion mounted at their free ends to said axle for rotation therewith to swing said first portion about the axis of said axle, a crank drivingly connected to said axle, cam means stationarily supported above said table adjacent said header means between said axle and said cutter, said cam means having a face inclined downward and toward the input end of said machine, a connecting rod, and guide means carried by said header means and supporting said connecting rod for axial reciprocation, one end of said connecting rod being drivingly connected to said crank with the other end thereof bearing against said cam surface.

10. For use with a power cutting machine comprising a material-supporting table, a rotary cutter journalled from said table and having an active portion disposed above the material-supporting surface of said table, a lower feed roll carried by said table ahead of said cutter for rotation upon an axis substantially parallel to the axis of said cutter, an upper feed roll, and header means supported above said table for vertical movement relative to said table and mounting said upper feed roll substantially vertically above said lower feed roll in cooperative association therewith for rotation upon an axis substantially parallel to the axis of said lower feed roll, the invention including non-kick-back means for said cutter comprising the combination of lower means located between said upper and lower feed rolls and said cutter, and upper means located ahead of said upper and lower feed rolls, said lower means comprising a plurality of finger means supported from said table for independent swinging movement about an axis spaced beneath the top of said table and substantially parallel to the axis of said cutter, said finger means being projectible above the top of said table into the path of material moving through said machine and engageable thereby to be swung about said axis and moved beneath the top of said table as material passes over said finger means, means for preventing movement of said finger means from their said projected positions in the opposite direction, and means resiliently engaging said finger means to urge them toward their projected position, and said upper means comprising an axle journalled in said header means ahead of said feeder rolls upon an axis substantially parallel to the axis of said feeder rolls, a plurality of thin finger elements each journalled near one end on said axle in closely spaced relation and each formed with a chisel end opposite said one end, said finger elements being urged by gravity toward a position in which the chisel end of each thereof points downward toward the top of said table, a bail element comprising a portion spanning said finger elements on the side thereof facing the input end of said machine, and side portions substantially at right angles to the first said portion mounted at their free ends to said axle for rotation therewith to swing said first portion about the axis of said axle, a crank drivingly connected to said axle, cam means, means supporting said cam means above said table and adjacent said header means between said axle and said saw blade for vertical adjustment relative to said table, said cam means having a face inclined downward and toward the input end of said cutter, a connecting rod having an axial slot formed therein, a headed pin taking through said slot and engaging said header means to support said connecting rod for axial reciprocation on said header means, one end of said connecting rod being drivingly connected to said crank with the other end thereof bearing against said cam surface, an arm fixed on said axle for rotation therewith, and stop means carried by said header means and disposed in the path of said arm to limit the degree of oscillation of said axle.

References Cited in the file of this patent

UNITED STATES PATENTS

| Number | Name | Date |
| --- | --- | --- |
| 1,108,586 | Kleinegger | Aug. 25, 1914 |
| 1,368,773 | Voss et al. | Feb. 15, 1921 |
| 1,818,300 | Burrows | Aug. 11, 1931 |